United States Patent [19]

Roberts, Jr.

[11] 4,024,762

[45] May 24, 1977

[54] DIRTY FLUID FLOW METER

[75] Inventor: William Walter Roberts, Jr., Yardley, Pa.

[73] Assignee: Mobil Oil Corporation, New York, N.Y.

[22] Filed: June 1, 1976

[21] Appl. No.: 691,933

[52] U.S. Cl. .................................. 73/228; 73/205 R
[51] Int. Cl.² ........................ G01F 1/28; G01F 1/34
[58] Field of Search ............ 73/228, 205 R, 194 R, 73/212

[56] References Cited

UNITED STATES PATENTS 3,530,714  9/1970  Akeley ................................. 73/228

Primary Examiner—James J. Gill
Assistant Examiner—Anthony V. Ciarlante
Attorney, Agent, or Firm—Charles A. Huggett; Ronald J. Cier

[57] ABSTRACT

An instrument for measuring flow rates in systems where contaminants in the moving fluids can accumulate on normal measuring devices and render them inoperative. This instrument consists of pitot-static tubes inserted into the conduit, one upstream and one downstream, the nozzles of said tubes being fed with a purge gas at a pressure higher than that of the vapors in the conduit. The nozzles are enclosed by a capsule with an opening in the side to allow passage of the appropriate gas lines and release of the purge gas into the conduit, said capsule being separately supported on a flexible rod and serves as a flapper valve, altering the pressure on the pitot tube nozzle as the moving fluids push against the upstream end of the cylinder. The change in relative purge gas pressure in the pitot-static arrangement is then monitored as a function of flow rate in the conduit.

3 Claims, 5 Drawing Figures

DIRTY FLUID FLOW METER

BACKGROUND OF THE INVENTION

1. Field of the Invention

This invention relates to the measurement of flow rates in conduits carrying so-called "dirty" fluids - i.e. gases or liquids containing liquid and/or solid contaminants. In one of its preferred aspects this invention relates more specifically to the measurement of flow rates in conduits leading to refinery burn-off flares.

2. Description of the Prior Art

Many industrial applications involve the movement from one point to another of fluid products or fuels containing particles of extraneous material. Since this movement is usually accomplished through a pipeline or similar conduit it is essential for safe and efficient operation that the rate of flow of the fluids be known at all times. However, the insertion of a device for measuring the rate of flow into the "dirty" stream provides a surface to which the contaminant particles may cling and, in the case of existing devices, plug up openings meant to sense the pressure or movement of the fluids in the conduit or otherwise render the device inoperative or inaccurate. Some of these applications include the control of the air/fuel ratio to industrial boilers to achieve optimum safety and efficiency, measurement of the total emissions to the atmosphere from flue stacks, and monitoring of refinery flare gas lines to control gas/steam ratios for smokeless and noiseless burning of hydrocarbon wastes and detection of leaks in refining columns which result in undue loss of recoverable energy-producing hydrocarbon fuels.

SUMMARY OF THE INVENTION

The instrument of this invention comprises two tubes inserted into the conduit terminating at nozzles parallel to the direction of flow through the conduit and in a pitot-static arrangement, that is one of the aforementioned nozzles pointing downstream and subject to a reduction in pressure and the other pointing upstream and being subject to an increase in pressure due to the pressure of the moving stream against the capsule and its resultant movement in relation to the fixed nozzles. The nozzles are rigidly supported and are encased in a capsule which is separately supported on a flexible member and is not in contact with the rigid parts of the instrument, thereby enabling the capsule to move back and forth in the direction of the flowing stream, said movement being a result of the flowing fluid pushing on the upstream end of the capsule and causing it to move toward and throttle the pitot tube nozzle.

The purpose of the capsule is threefold: first to shield the nozzles from the dirty stream and thereby prevent them from becoming plugged, second to serve as a flappper valve and third, to serve as a pressure multiplier. A gas is fed into the pitot-static tubes at a constant rate of flow and at a pressure which is higher than that of the flowing stream. The gas would normally be provided in equal quantities to each nozzle either by flow measurement or by flow through fixed orifices.

Under conditions of zero flow the pressure in both tubes will be equal and influenced only by the static pressure in the conduit. As the rate of flow of the stream increases the capsule will move downstream slightly thereby increasing the pressure on the gas flowing out of the upstream nozzle, while the pressure on the gas flowing out of the downstream nozzle will be decreased. By measuring the pressure in each tube it is then possible to relate the difference in pressure to the rate of flow of the fluid stream in the conduit.

The capsule diameter in relation to the nozzle diameter can be varied within considerable latitude to provide the desired degree of pressure difference between the two nozzle pressures. The gas emitting from the nozzles is ultimately discharged into the flowing stream, purging the capsule and helping to keep the nozzles and the interior of the capsule clean and free from plugging. The end of the capsule facing upstream will be subject to a small amount of fouling if the stream contains sticky material, but the effect on the accuracy of the meter is greatly minimized since the force developed depends primarily on the projected are of the capsule and that area will be almost unchanged with normal fouling. A specific embodiment is illustrated by the annexed drawings.

DESCRIPTION OF PREFERRED EMBODIMENTS

Figure 1:
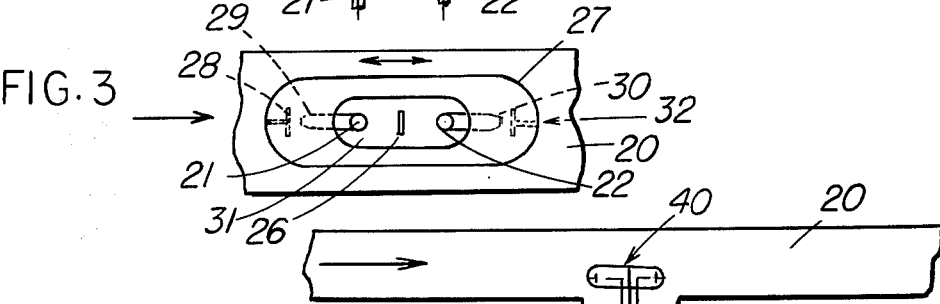
FIG. 1 is a schematic representation of an embodiment showing a typical flow monitoring system.
Figure 1:
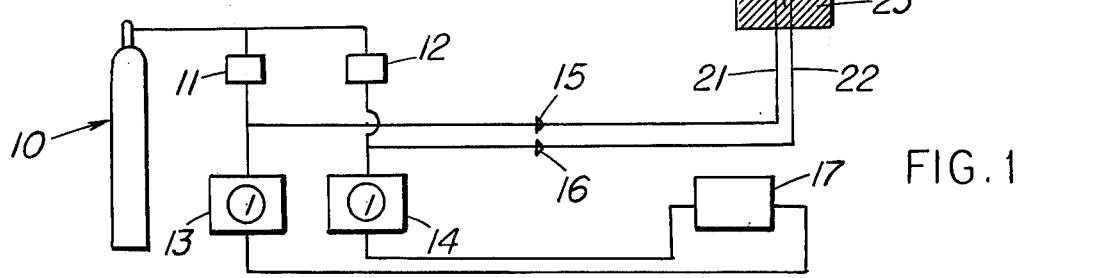

Referring to the drawings and more particularly to FIG. 1, a dirty fluid flow measuring device according to this invention is indicated generally at 40 as installed in a conduit 20. The flowing stream of which the rate of flow is to be measured is indicated to be moving in the direction indicated by the arrow. A measuring gas is supplied from tank 10, said gas being air, nitrogen, petroleum gas or any other combustible or non-combustible gas as the application may warrant. Alternatively, any other suitable source of pressurized gas may furnish the measuring gas for the embodiments of the invention. From tank 10, the gas is delivered at relatively high pressure to the inlet sides of rotameters 11 and 12 which, through the use of appropriate valving, are adjusted to allow predetermined and equal quantities of gas to constantly flow into tubes 21 and 22 through check valves 15 and 16, respectively.

Figure 2:
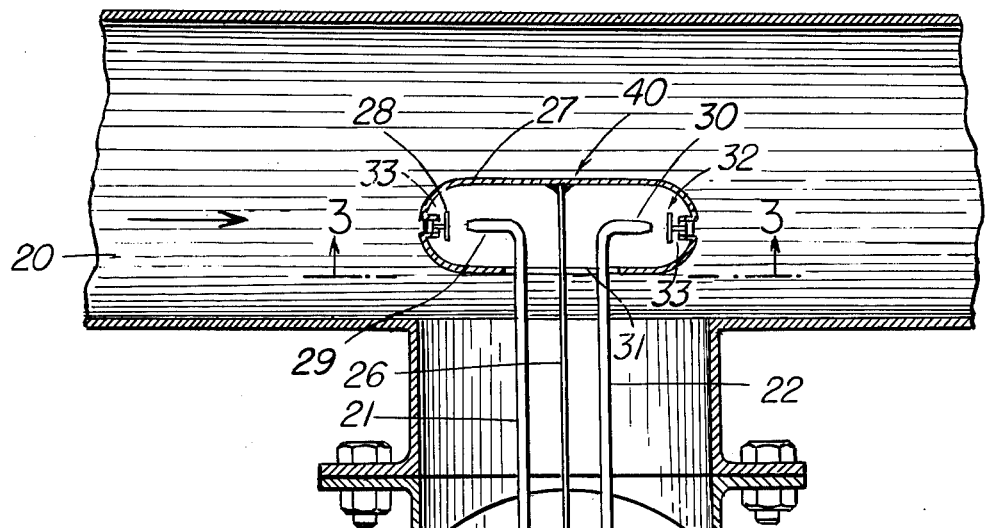
FIG. 2 is a detailed section of the instrument.

As can be seen in FIG. 2 the gas entering tube 21 then flows through the assembly support structure 23 to pitot nozzle 29 and discharges through port 31. Likewise the gas entering tube 22 will flow at the same rate through 23 to static nozzle 30 and discharge through port 31. Nozzles 29 and 30 are encased by capsule 27 which is supported by a flexible rod 26, which in turn is anchored in the assembly support structure 23. The tubes 21 and 22 enter capsule 27 through port 31, said port being sufficiently large that capsule 27 will at no time make contact with tubes 21 and 22, as indicated in FIG. 3.

Figure 4:
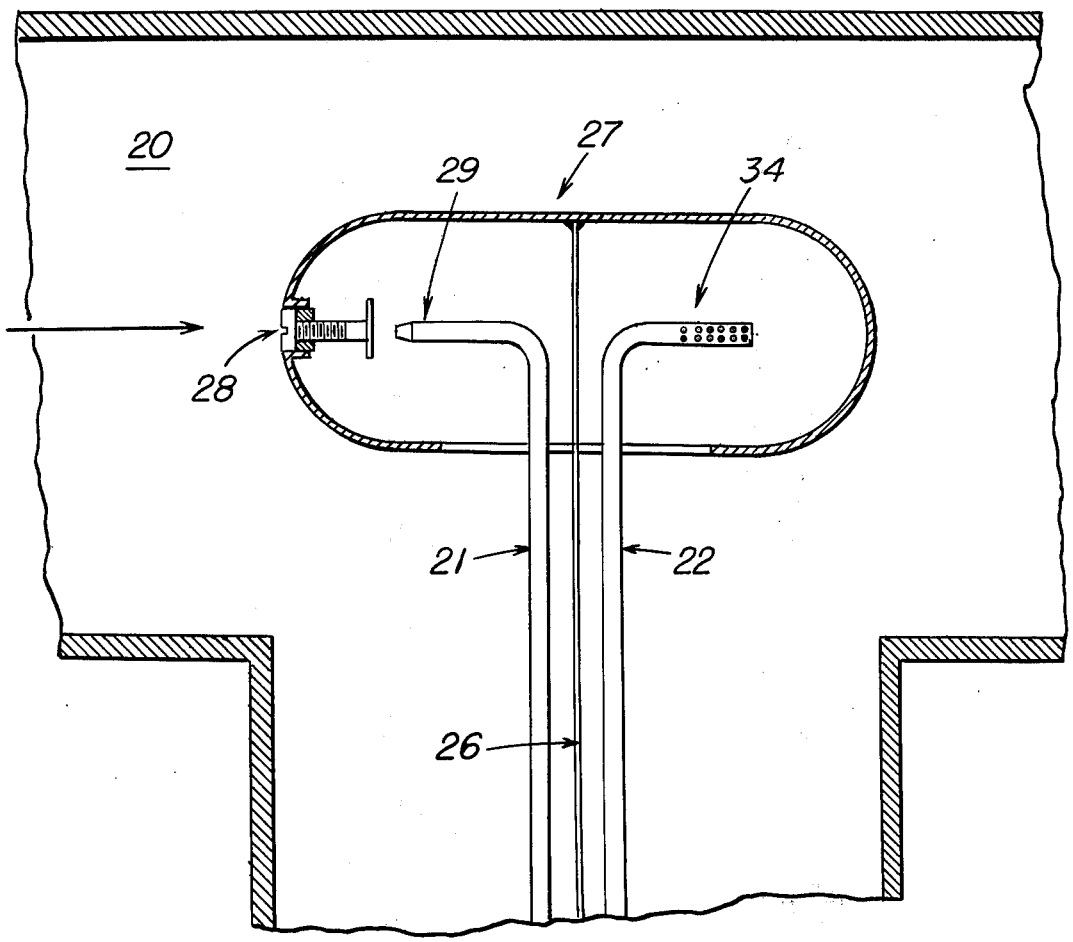
FIG. 4 is a detailed section of the instrument showing an alternative nozzle arrangement.
Figure 5:
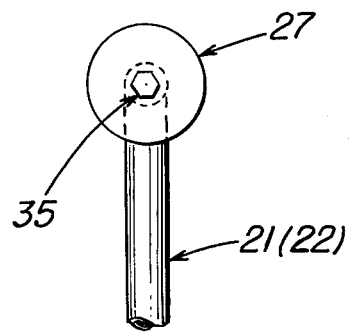
FIG. 5 is an elevation of the instrument.

Attached to the interior of the capsule 27, on the upstream end and directly in front of nozzle 29, is target 28 and on the downstream end and directly in front of nozzle 30, is target 32, said targets being flat and round with a diameter that is no less than twice the inside diameter of nozzles 29 and 30. Targets 28 and 32 are adjustable as to the clearance between the targets and the nozzles so as to equalize pressures at no fluid flow conditions in conduit 20. Said adjustment may be made by means of a screw type support as indicated at 33 in FIG. 2 or by any other suitable means. The double nozzle and target arrangement will maximize the accuracy of the instrument bu minimizing and stabilizing the movement of capsule 27 since its position will then depend to very little extend on the resistance of support rod 26. A somewhat less involved arrangement might be constructed as indicated in FIG. 4 wherein static tube 22 does not terminate in a nozzle but is sealed on the end, allowing the purge gas to pass through a group of equally spaced holes in section 34 and thence into capsule 27 as described above. In this embodiment the flexibility of support rod 26 becomes more important to the sensitivity of the instrument since it must allow a larger range of movement of capsule 27 at a given rate of flow in conduit 20 to achieve the same difference in pressure between tubes 21 and 22 as was achieved in the dual target embodiment. Support rod 26 must than be constructed of a material which will offer good vertical support but will be sufficiently flexible in the nozzle movement direction to allow capsule 27 to change position slightly with the fluid flow in conduit 20.

Figure 3:
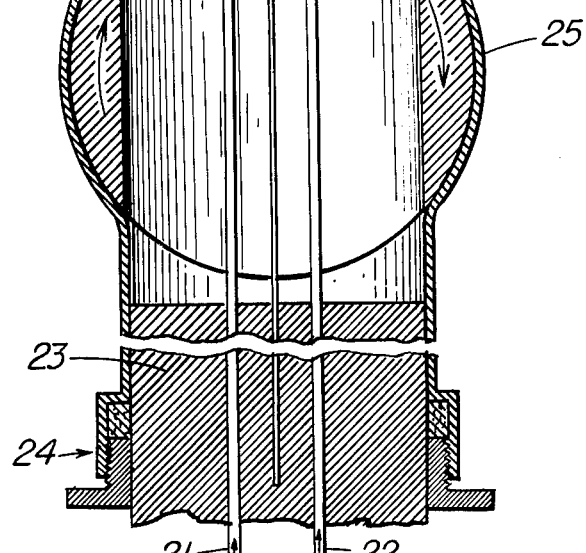
FIG. 3 is a section on line 3—3 of FIG. 2.

Support rod 26 may be of a bar type structure as indicated in FIG. 3, or may be round or of any other geometry as accomplished the purpose of a sightly flexible support for capsule 27.

In operation the purge gas will flow through tubes 21 and 22 and out nozzles 29 and 30 at the same rate. Upon leaving pitot nozzle 29 the gas will impinge upon target 28, flush through capsule 27 and discharge into the fluid stream through port 31. Upon leaving static nozzle 30 the gas will impinge upon target 32, thence flushing through capsule 27 and discharging into the fluid stream through port 31. The flowing stream will push against the upstream end of capsule 27 causing flexible member 26 to bend slightly and thereby causing target 28 to be displaced toward pitot nozzle 29 and press toward it with a force which is proportional to the rate of flow of the stream. The fluid passing through tubes 21 and 22 will then be at pressures which are equal to the sum of the static pressure and the pressure necessary to overcome the throttling effect applied to nozzle 29 by target 28 and to nozzle 30 by target 32 said pressures being indicated on pressure sensitive means 13 and 14.

Pressure sensitive means 13 and 14 may be of an indicating and/or recording type. The difference in the pressures sensed by means 13 and 14 will be a direct indication of the pressure due to fluid velocity only and said velocity may then be determined using a previously prepared calibration chart. Said calibration chart may be prepared as follows. Under conditions of no fluid flow targets 28 and 32 are positioned by means of screw adjustements 35 until the pressures inside tubes 21 and 22, as indicated on pressure sensitive means 13 and 14 respectively, are exactly equal. The device is then calibrated under flow conditions outside the capsule, greater ultimate accuracy in subsequent flow measurement usually being obtained the more closely calibration conditions approach actual measurement conditions.

Pressure sensitive means 13 and 14 can be designed to operate a controller, recorder, or auxiliary equipment herein designated as 17 in FIG. 1, such as mixing valves, emergency shutdown switches, safety vents, bypass valves, or any other device whose operation is contingent upon the rate of flow of the stream in the conduit, all as well known in the art.

Reference numeral 25 in FIG. 2 represents an optional ball valve which may be used in conjunction with packing gland 24 to facilitate installation and removal of this invention without interrupting the flow in the conduit. Installation is accomplished as follows. With ball valve 25 in the closed position the instrument is inserted through packing gland 24 until support assembly 23 is within the gland. The gland is then tightened and 25 is turned to the open position and the instrument slid the rest of the way into position. The instrument is aligned within the conduit by means of alignment marks which may have previously been made on 23 or by other means well known in the art, and the gland further tightened as necessary. Withdrawal of the instrument may be accomplished by reversing this procedure. Alternatively the device may be attached directly to the conduit by means of a flange and bolts or any other means deemed appropriate to the application.

This invention may be constructed of carbon steel or as in the case of corrosive streams or any other special application, whatever material is deemed appropriate to that application.

What is claimed is:

1. A device for measuring flow rate of fluid within a conduit comprising two tubes fixed in the conduit terminating in nozzles oppositely directed from each other, one upstream of the fluid flow and one downstream of the fluid flow, an enclosure about said nozzles having an opening for discharge from the enclosure into the stream flowing in said conduit, means for flexibly supporting said enclosure positioned as aforesaid, means to supply a fluid to each of said tubes under a pressure greater than the pressure in said conduit, means to monitor a characterisitic of the fluid flowing in each of said tubes, and a target in said enclosure adjacent to the nozzle of the said upstream tube.

2. A device according to claim 1 containing means to adjust said target in respect to its distance from said nozzle.

3. A device according to claim 1 containing another target in said enclosure adjacent to the nozzle of said downstream tube and means to adjust both of said targets in respect to their distances from said nozzles.

* * * * *

UNITED STATES PATENT AND TRADEMARK OFFICE
CERTIFICATE OF CORRECTION

PATENT NO. : 4,024,762

DATED : May 24, 1977

INVENTOR(S) : WILLIAM WALTER ROBERTS, JR.

It is certified that error appears in the above-identified patent and that said Letters Patent are hereby corrected as shown below:

Column 2, line 15     "projected are" should be --projected area--

Column 3, line 17     "than" should be --then--

Signed and Sealed this

*Twenty-seventh* Day of *September 1977*

[SEAL]

Attest:

RUTH C. MASON  
*Attesting Officer*

LUTRELLE F. PARKER  
*Acting Commissioner of Patents and Trademarks*